United States Patent [19]

Boue et al.

[11] Patent Number: 4,769,552
[45] Date of Patent: Sep. 6, 1988

[54] SYSTEM FOR HIGH SPEED READING OF A CHARGE TRANSFER MATRIX OPTICAL SENSOR ORGANIZED WITH ONE STROKE FRAME TRANSFER FOR THE VIDEO DETECTION OF BRIEF IMAGES

[75] Inventors: Philippe Boue, Villennes sur Seine; Claude Imhoff, Chamteloup les Vignes, both of France

[73] Assignee: Thomson-CSF, Paris, France

[21] Appl. No.: 7,379

[22] Filed: Jan. 27, 1987

[30] Foreign Application Priority Data

Jan. 24, 1986 [FR] France ............................ 86 01056

[51] Int. Cl.⁴ ............................................ H01J 40/14
[52] U.S. Cl. .................................. 250/578; 358/213.25
[58] Field of Search .................... 250/578, 213 VT; 358/213.25, 213.26, 213.11, 213.27, 213.15, 213.22, 213.28

[56] References Cited

U.S. PATENT DOCUMENTS 4,602,289  7/1986  Sekine ........................... 358/213.22
4,635,122  1/1987  Kato et al. ...................... 358/213.25
4,644,405  2/1987  Roy et al. ....................... 358/213.25

Primary Examiner—David C. Nelms
Assistant Examiner—Jessica Ruoff
Attorney, Agent, or Firm—Cushman, Darby & Cushman

[57] ABSTRACT

A system is provided for the high speed reading of an image formed on the CCD sensor where the useful zones are formed of bands parallel to one of the directions of the matrix, and separated from each other by a gap without useful video information, each band and each gap being formed of several scanning lines, the geometrical arrangement of the bands on the matrix being known beforehand. The lines of each gap are transferred in succession into the register and the corresponding noise signals are not taken into account. The lines of each band are also transferred in succession so as to provided, pixel by pixel, the video signals summated in analog form for the band considered. The system applies more particularly to multichannel recording systems with streak camera.

8 Claims, 5 Drawing Sheets

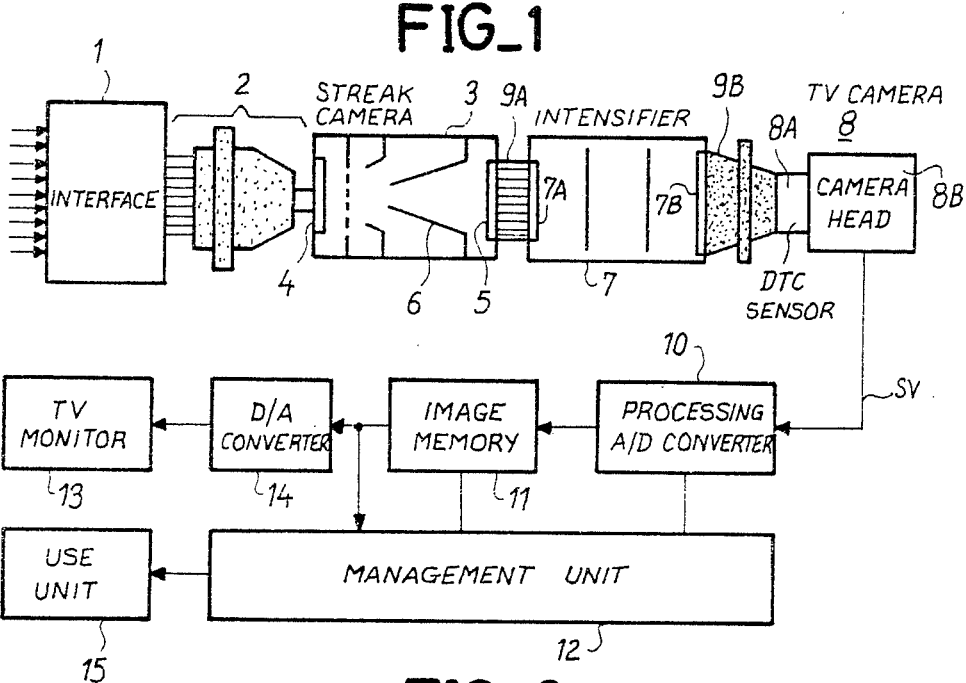
FIG_1
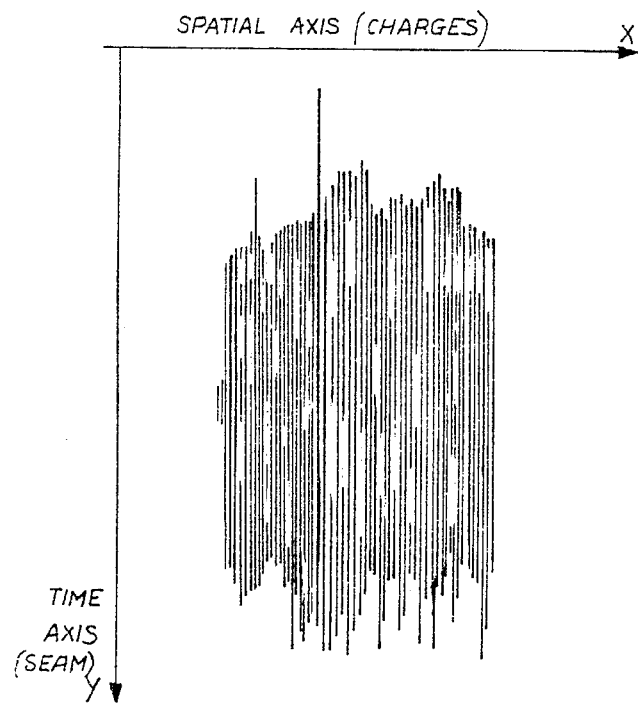
FIG_2

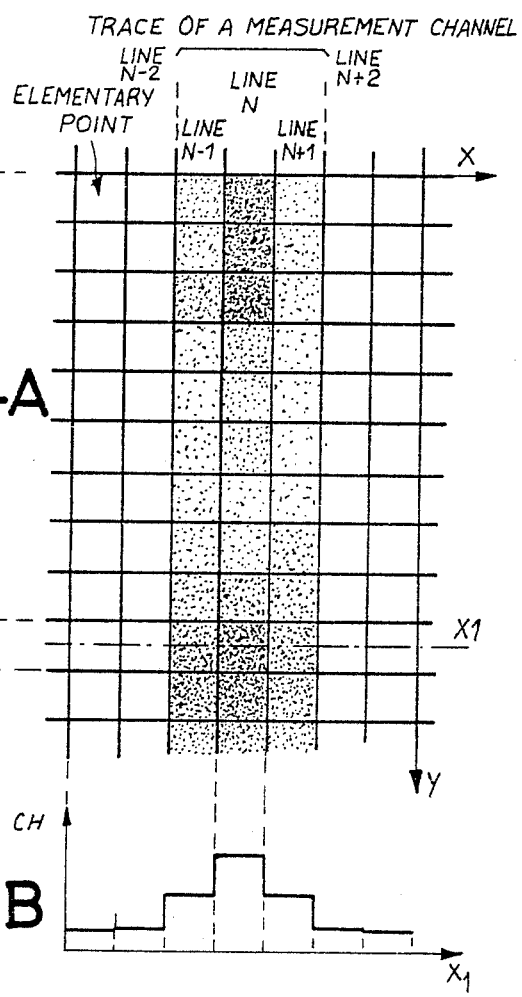
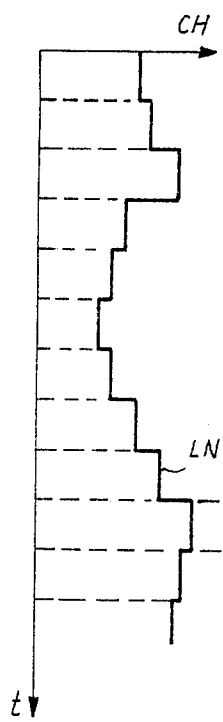
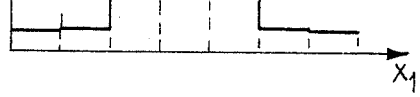
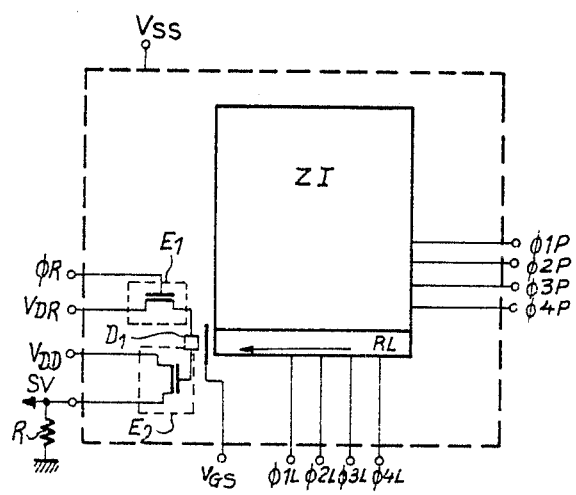

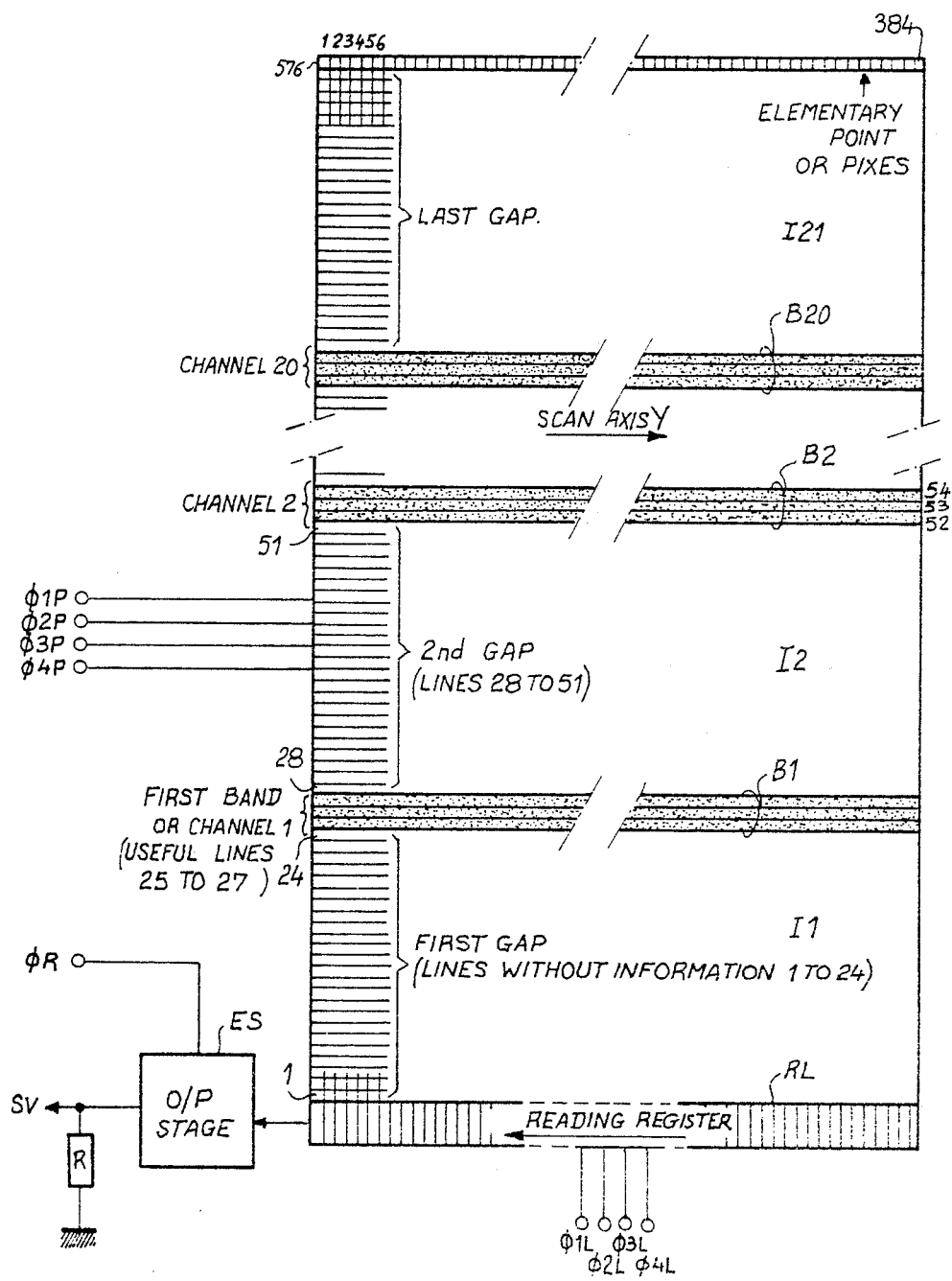
FIG_4

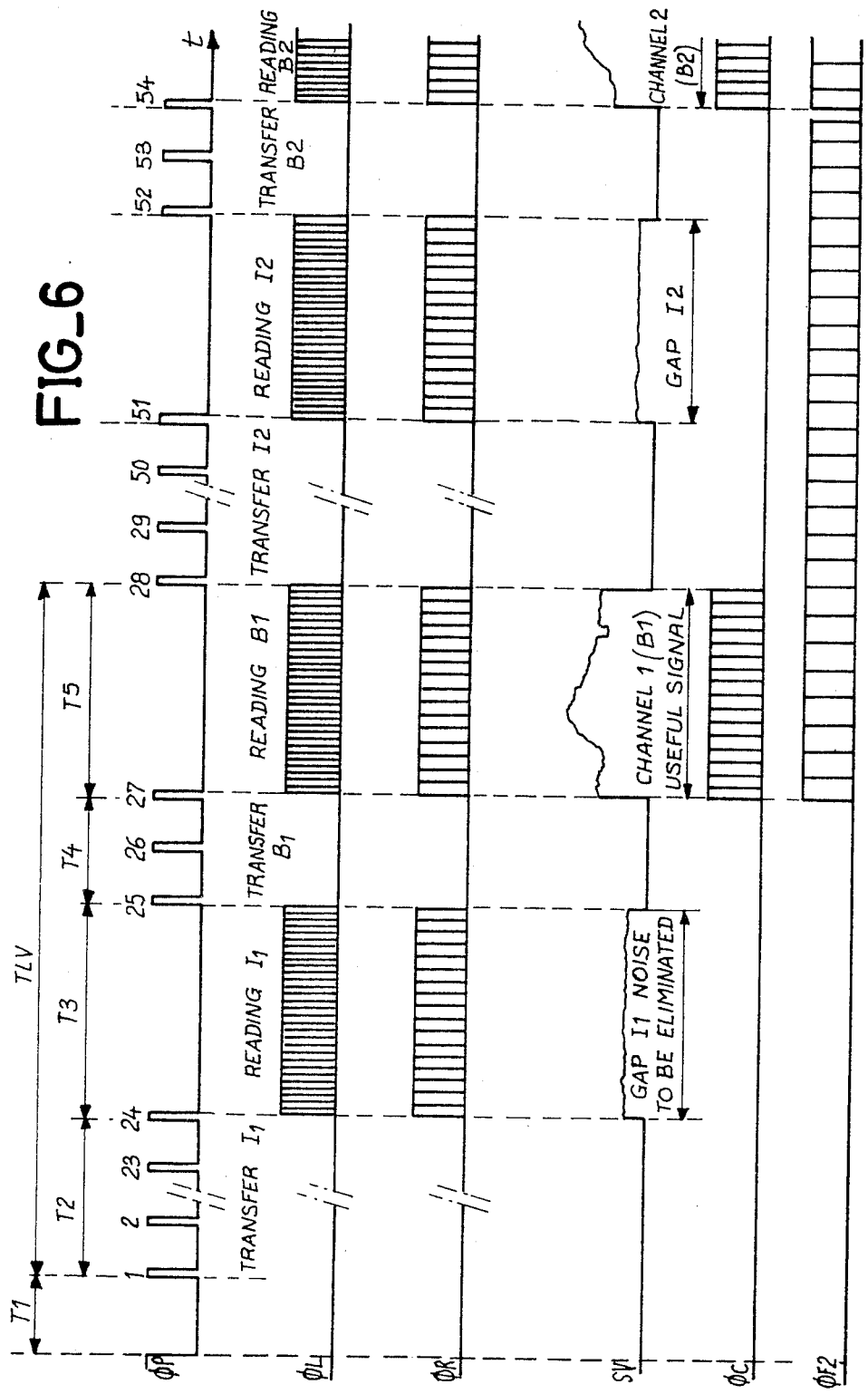

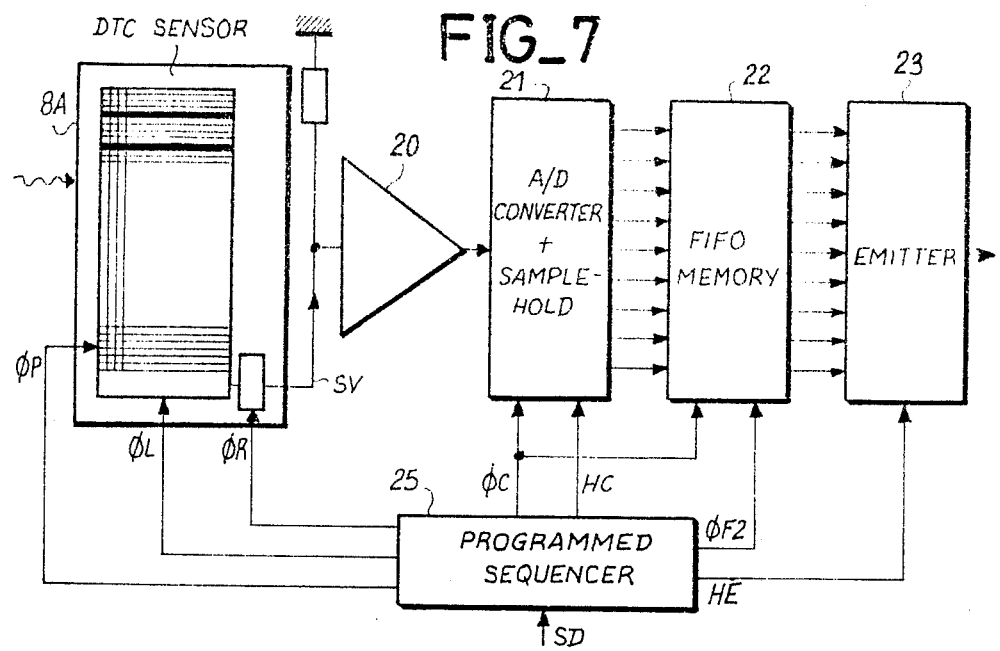
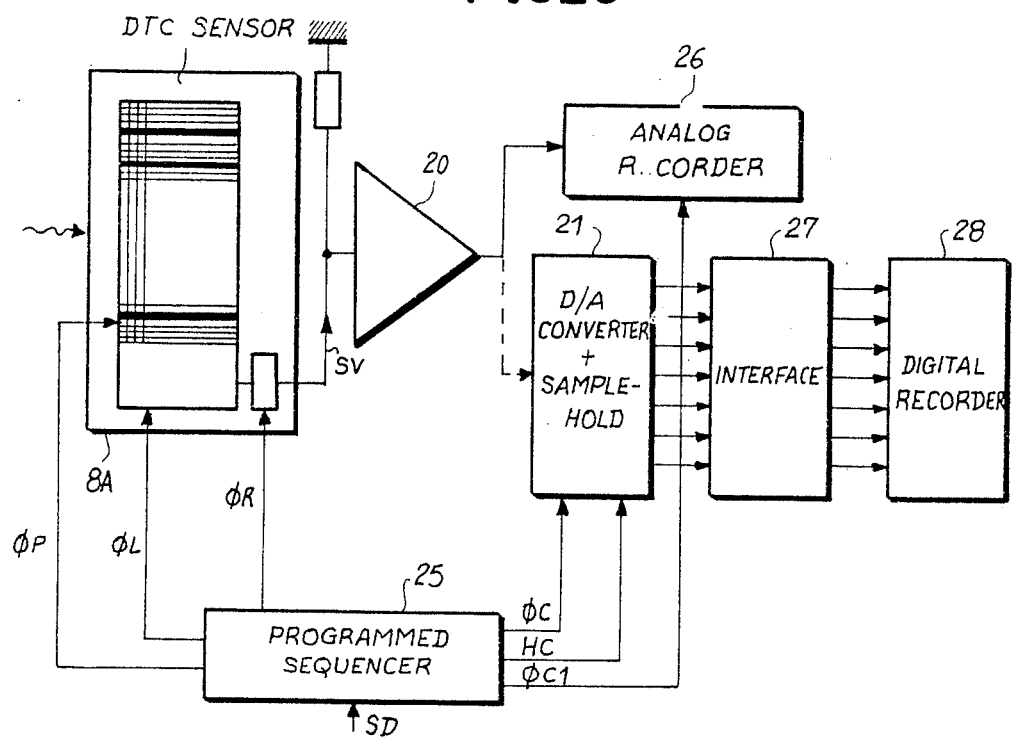

SYSTEM FOR HIGH SPEED READING OF A CHARGE TRANSFER MATRIX OPTICAL SENSOR ORGANIZED WITH ONE STROKE FRAME TRANSFER FOR THE VIDEO DETECTION OF BRIEF IMAGES

BACKGROUND OF THE INVENTION

1. Field of the Invention

The present invention relates to a system for the high speed reading of a charge transfer matrix optical sensor organized with one stroke frame transfer for the video detection of brief images. The use of the invention is more particularly contemplated for a multichannel reading system of optical signals using a streak camera.

2. Description of the Prior Art

Detection matrices are known formed as a solid charge transfer circuit used for transferring television image frames. For example, the sensor TH 7861 of THOMSON-CSF is organized for effecting the frame transfer to the TV standard CCIR, it comprises 576 lines of 384 points. This known matrix structure includes a photosensitive zone and a storage zone, each of 288 lines. After integration and exposure for the duration of a frame, namely 20 milliseconds for 25 images/second, the corresponding information is transported from the photosensitive zone to the storage zone where it is reread at the television rate through a reading register whereas the second frame offset by a line for providing interlacing is integrated in the photosensitive zone. With such a sensor an image can be read formed of two frames during a total time of 40 milliseconds in accordance with the television standard.

For a higher speed image analysis corresponding to much shorter phenomena, the photosensitive matrix is organized differently. This is the case of the TH 7882 of THOMSON-CSF which is derived from the above mentioned device and which is constructed with the same technology but the storage zone is also photosensitive. This configuration gives a large photosensitive area formed of 576 lines of 384 elementary points or pixels. This sensor can only be used in the one stroke mode; after integration, it must be placed in the darkness and the image may be read at any rate, provided that it is compatible with the integration of the dark current of the photosensor, and with the pass band of its internal circuits and its output amplifier. This solution has however limitations. The integration and reading times are limited by the increase of the dark current due to thermal effects. At 25° C., this limitation is of the order of 100 to 500 milliseconds. A minimum reading time of 25 milliseconds results from the maximum foreseeable frequency for the reading control signals also called reading phases.

Such a time is too long for the analysis of very brief phenomena. For the invention phenomena are contemplated which may for example be the order of 1 millisecond and which are not repetitive.

One solution would consist in using the above one stroke matrix in a reduced part of its photosensitive zone by reducing the number of pixels of the image sufficiently for reducing the time for reading the image. This solution is however not satisfactory for the resolution of the image is seriously degraded thereby.

The solution proposed by the invention allows these very brief times to be obtained as well as the optimum resolution for the image corresponding to the whole of the points of the matrix.

SUMMARY OF THE INVENTION

The aim of the invention is achieved by providing a high speed reading system for a sensor of a type considered, in which the video information is distributed in several parallel bands each including several lines of pixels, the remaining part of the detection matrix forming separation gaps between the bands and being deprived of useful video information, each gap between two successive bands including several lines of pixels, the XY arrangement of the bands in the detection matrix being known, the sensor also having a reading register followed by an output circuit and an associated signal generator for controlling the reading. The means for reading the sensor are defined so as to provide, not only for each band but for each gap, the parallel transfer of the successive lines forming the band or the gap considered, before commanding the series reading of the contents integrated in the register, so as to allow reading at maximum speed of said gaps while controlling the elimination of the corresponding detected noise, as well as to obtain directly and in analog form the integration pixel by pixel of the useful video signals of the lines of each band.

The advantages resulting from the proposed solution are due essentially to the analog and non digital integration as it was practiced before and which avoids errors, and to the fact that an improved signal/noise ratio is obtained and so a higher sensitivity of the system.

The invention is used more particularly for forming a multichannel signal recording system using a streak camera. Such a system allows transitories to be recorded over a high number of samples.

The advantage of the streak camera as optical transitory recorder is due to the substantially instantaneous transformation of light into electrons at the photocathode and to the storage of the signal at the level of the screen, which allows it to be taken up by a video camera and to be digitized in deferred time. Another advantage is that the signal may be amplified with a very wide passband.

BRIEF DESCRIPTION OF THE DRAWINGS

The features and advantages of the invention and the use thereof in a multichannel recording system will be clearer from the following description given by way of example with reference to the accompanying Figures which show:

FIG. 1, a block diagram of a multichannel system for recording brief signals by means of a streak camera, and a DTC camera with high speed reading analysis in accordance with the invention, FIG. 2, an image pattern with a plurality of parallel traces at the level of the DTC sensor of the system of FIG. 1;

FIGS. 3a, 3b, and 3c, a detail of a trace with variations of the charges along the spatial axis and along the time axis;

FIG. 4, a representation of one example of distribution of the useful bands in the DTC matrix;

FIG. 5, a diagram recalling the organization of the DTC sensor for one stroke frame transfer;

FIG. 6, a timing diagram of the main control signals and of the video signal in accordance with the high speed reading method used; and FIGS. 7 and 8, diagrams of systems for image recovery with high speed reading of a DTC sensor in accordance with the invention.

DESCRIPTION OF THE PREFERRED EMBODIMENTS

To facilitate understanding of the invention it will be considered in the contemplated application to an optical signal multichannel recording system. It goes without saying that this use is not limitative for the invention and that the high speed reading system proposed applies to any unit in which the video information is divided up into parallel bands whose arrangement on the surface of the DTC matrix is known before hand, each band having a plurality of scanning lines and being separated from the next by a gap without useful video information.

FIG. 1 recalls the general structure of such a multichannel signal recording system. The streak camera is used for recording multiple optical signals whose resolution in time is less than 100 or so picoseconds. The phenomenon to be observed, whether it is electric or optical is applied to an input interface circuit 1 which elaborates calibrated optical signals. These optical signals are gathered together by means of a fiber optical adapter 2 into a slit, situated at the input of the streak camera 3. Adapter 2 gathers together the bundle of fibers into a light slit corresponding to the linearly juxtaposed fibers. The streak camera 3 has at the input a photocathode 4 and at the output an anode with a fluorescent screen 5 and between the two grids and deflecting electrodes 6. Taking into consideration the number N of optical channels each corresponding to a fiber, at the input of camera 3 N optical channels are available juxtaposed in a line and which, through deflection will then be moved orthogonally to the direction of the light slit so as to display for each of these N channels the variation in time of the corresponding phenomenon. At the output of the streak camera, the signal may be applied for this purpose to a television camera 8 if the gain is sufficient. Generally, between the streak camera and the television camera and image intensifier tube 7 is disposed for increasing the light intensity of the signal and reestablishing sufficient gain. The fluorescent screen 5 of the streak camera is optically coupled to the input photocathode 7a of the intensifier tube, this coupling being generally assumed by an optical fiber block 9a. Similarly, the output of the intensifier includes a fluorescent screen which is coupled by a fiber block or reducing cone 9b to the television camera 8. This latter has a photosensitive sensor 8a considered as a solid charge transfer circuit called DTC. The sensor is formed of an XY matrix of photosensitive elements which form the points or pixels of the image and which receive the light flux of the image from the output of the intensifier. This matrix is itself followed by the camera head 8b including a preamplification and reading circuit for producing a video signal SV similar to that of television type scanning.

This video signal is transmitted to processing and conversion circuits 10 in which it may undergo a certain number of corrections such as the correction of black non uniformity, the elimination of elements of the matrix having local defects and correction of the non uniformity of response of the elements of the matrix. The signal is delivered in digital form to an image memory 11 which may include several image planes for storing a certain number of successive images.

The assembly formed by the two cameras 3 and 8, the processing circuits 10 and the image memory 11 are managed by a management unit 12. The stored image signals may be displayed on a monitor 13 after conversion into analog form in a converter 14, under control of unit 12. In another method of use, the signals are transmitted through an input-output coupler to an associated user unit 15 which may include a computer or different digital recording circuits.

The rapid variations in time of the intensity of the light signals applied to the streak camera 3 are transformed at the level of matrix 8a into charge variations along the scanning axis. They may then be recorded on a film or measured by means of an image recovery and digitization unit.

FIG. 2 reproduces an example of the image obtained under these conditions and formed by a series of rectilinear traces. Each trace corresponds to an optical channel and occupies a given number of lines, for example three useful lines along the scanning axis Y corresponding to the time axis. This trace width depends on the diameter of the fiber transmitting the optical signal of the channel and on the coefficient of reduction of the image introduced into the system. The traces are separated by a free space or gap which contains no useful video information. This gap occupies for example 24 lines between each trace or useful band. It may be considered that there are 20 optical measurement channels and that the matrix sensor includes 576 lines of 384 pixels. The useful information is formed, in the transverse direction X called spatial axis, of the sum of the three pixels forming the trace of the channel considered. In the longitudinal direction corresponding to the scanning time axis Y and depending on the desired resolution in time, it is possible to summate the charges of several consecutive pixels so as to have a sample.

The output stage of the reading register RL is formed with a floating diode (D1, FIG. 5) which provides the charge-voltage conversion of the signal corresponding to each pixel. Normally, before the arrival of each charge packet, the potential of the reading diode is fixed at a reference level by a precharge transistor (E1). If such levelling is not carried out for a group for example of three consecutive pixels, the corresponding charges are summated in the floating diode and the output voltage further to this operation represents the sum of the charges accumulated in these pixels. It goes without saying that the highest resolution but the longest reading time will result from a number of samples equal to the number of pixels in the Y scanning direction. It will be considered that the matrix which has 384 elementary pixels in this direction may provide 300 useful points or pixels. If it is for example chosen to summate two pixels in this longitudinal direction, a useful sample will be represented by the sum of six pixels corresponding to the two longitudinal pixels and to the three transverse pixels. The total number of useful samples is equal to the number of samples per channel multiplied by the number of channels, namely in this case $(300/2) \times 20 = 3000$. This figure is to be compared with the total number of pixels of the sensor which is $576 \times 300$ namely 172,800. The ratio of these two results shows that the number of useful samples occupies 1/58th of the total useful surface of the sensor.

FIG. 3a shows in greater detail a portion of a trace and shows, as a function of the variation in time of the signal, the variations in density of the charge on the three scanning lines during time. This charge variation is shown on the useful lines of order N, N−1 and N+1 corresponding to the trace considered.

FIG. 3b shows the distribution of the charge in for example direction $X_1$ parallel to the spatial axis X. The charges beyond the three useful scanning lines considered are formed by noise signals and for the useful lines by the noise and useful signal together.

FIG. 3c shows the variation in time of the trace along for example the line N.

FIG. 4 shows the distribution of the useful bands $B_1$, $B_2$, ... $B_{20}$ on the photosensitive surface of the matrix with the separation of gaps $I_1$, $I_2$, ... $I_{21}$ corresponding to zones without useful information between these bands. In the lower part is shown the reading register RL followed by the output stage ES with a control input ØR, for resetting the level of this stage, the video signal output SV and the inputs of the reading control phases Ø1L, Ø2L, Ø3L, Ø4L of the register. The control phases Ø1P, Ø2P, Ø3P, Ø4P correspond to the line transfer signals of the image zone in the register.

FIG. 5 recalls the structure of the DTC matrix sensor of type Th7882 considered for providing one stroke operation with an image zone Z1, the register RL and the output circuit formed of a diode D1, a level resetting stage E1 and an output amplifier stage E2.

The timing diagram of operation of the DTC sensor is shown in FIG. 6. The conventional operation of this sensor will be recalled. In the image zone, the incident photons pass through the insulating grid structure before being absorbed in the substrate while creating electronic-hole pairs. The holes are recombined in the substrate whereas the photoelectrons are gathered together in the potential pits, created by MOS capacities formed by the grids biased by the control phases ØP. The amount of charges accumulated is proportional to the illumination received and to the integration time. After the period of integration, the image zone must not receive any illumination during the reading period, so as to avoid degradation of the signal by the parasite light. The 576 lines of the sensor are transferred in parallel, line by line, to the output register RL. Additional transfers from the image zone Z1 to the reading register RL provide a dark reference of the frame.

The charges corresponding to a video information line are therefore transferred in parallel into the reading register by the phases ØP; they are then transferred sequentially point by point by the register to a single output circuit. The register includes 405 stages; the number of transfer phase periods ØL is then 405 at the minimum. At the output of the register is disposed the circuit formed by a floating diode D1 which provides the charge-voltage conversion of the signal corresponding to each elementary point. Before the arrival of each of the charge packets, the potential of the reading diode is fixed at a reference level by a precharge MOS transistor E1. The potential of the reading diode is then applied to the input of an amplifier E2 delivering the video signal SV with low impedance. The load of the amplifier E2 is formed by a resistor R. We have seen that this conventional oepration of the DTC sensor requires a minimum reading time of 25 milliseconds for the maximum foreseeable frequency of the reading phases. The information delivered by the 405 stages of the register include prereading points, points for absorbing the edge effects, the 384 image points which may contain useful video information of the line and post reading points. The points not containing any video information are all read during line suppression. The overall reading time for obtaining useful information is increased by reading the zones without useful information. We saw above, for the example contemplated, that the ratio between the total number of pixels of the sensor and the number of pixels including the useful information for multichannel recording could be equal to 58.

The high speed reading principle proposed by the invention consists in practically eliminating the time for reading the useless zones without video information corresponding to the gaps between the traces, and summing the charges accumulated in the useful zones formed by the bands whose arrangement in the image zones Z1 is known.

Referring to FIG. 4 and to the timing diagram FIG. 6, the situation is as follows at the end of the integration time T1 of the image. There is first of all a first interval T2 formed by the lines 1 to 24 of the first gap I1 which contains no useful information. The trace of the first channel or band B1 occupies the next three lines 25, 26 and 27. The following lines 28 to 51 represent the second gap I2 which contains no useful information. Then comes the second band B2, or trace of the channel 2 to be analysed, which occupies the three lines 52, 53 and 54 and so on for the other gaps and the other bands B3 to B20.

In accordance with the invention, the useless zones or gaps deprived of video information are eliminated. This elimination is tantamount to reducing as much as possible the time for reading the lines corresponding to the gaps. To explain the corresponding procedure, we will consider the first gap I1, lines 1 to 24 situated above the register RL (FIG. 4) The phase signals ØP from 1 to 24 cause the lines 1 to 24 to be transferred successively and rapidly into the reading register. These successive transfers are produced without reading the corresponding line each time, which eliminates the times required for reading these lines by the register RL where the reading takes place in series. The reading register RL integrates then all the residual noise charges from lines 1 to 24 and which correspond to the black level increased by the noise fluctuations. It is necessary to remove the corresponding integrated signals in the register so as to prepare this latter for receiving the following data corresponding to the useful lines of the first band B1. For this, the control signals ØL (there are as many ØL signals as there are stages in the register), drive the charges accumulated in the successive stages of the register towards the reading diode. At the same rate, or at half the rate for example, as shown, the level resetting signal ØR is applied to the output stage for removing the resulting noise signals and resetting the register to zero. The fact of not taking this noise into account is advantageously controlled from the management unit 15 during the reading time T3 of the first gap I1, then that for reading I2, etc. At the end of this first period T3 for reading the first gap we have the following situation: the reading register RL is emptied and the useful charges of the first band B1 which were in lines 25 to 27 are now transferred respectively to lines 1 to 3 ready to be transferred into the register.

For carrying out this following phase of duration T4, a gain of time is again obtained by avoiding carrying out a transfer followed by line by line reading. The procedure used consists here also in transferring the three lines of the band considered successively into the register RL where the useful charges are then integrated pixel by pixel and form analog signals. The phase signals ØP, numbers 25, 26 and 27, cause this first band to be transferred into the register. Each cell of the output register thus receives the sum of the charges of three pixels, corresponding to the pixels of the same rank in the three lines occupied by the trace. Then comes the period T5 for the reading properly speaking of these three lines and here again the signals ØL cause the charges to be moved to the output stage. Every n ØL (we can assume n=2, as in the preceding case, if it is desired to integrate the pixel stored in the register n by n), the level resetting signal ØR is applied. Each sample thus emitted at the output represents then 3 n pixels (n columns×3 lines). For a maximum resolution n=1 and each sample represents three pixels. An analog integration of the signal of channel 1 has thus been performed by the DTC sensor. The resulting information is the representation, within the accuracy of the transfers, of the light intensity received by the sensor.

We then find the second gap I2 which was situated initially between lines 28 to 51 and which is not transferred between lines 1 and 24 ready to be transferred and read by the reading register RL. The procedure is the same as for that described for the first gap. The same goes then for the second channel which formed a band B2 grouping together the lines 52, 53 and 54 and which will be found at the end of reading of the second gap transferred into lines 1, 2 and 3 ready to be read and so on for the other gaps to be elminated and for the other bands corresponding to the channels 3 to 20 remaining to be analyzed.

FIG. 7 shows the block diagram of a rapid reading image recovery system of a DT sensor in accordance with the technique which has just been described and shows circuits which may be associated with the sensor. After the output stage ES, the video amplifier 20 is fed with the useful video signal and delivers this amplified signal to an analog-digital converter with a sample and hold unit 21. Then comes a FIFO register 22 which receives in parallel the data from the converter, then an emission circuit 23 which places the digital information in series with, possibly, conversion into optical form for transmission by optical fiber.

The programmable sequencer 25 may be formed from a basic clock and pulse train generators corresponding to the signals ØP, ØL, ØC and ØF2 shown in FIG. 6. These generators may be constructed either according to conventional logic (TTL, CMOS . . . ) for example in the form of counters associated with programmable decoders, or by means of programmed circuits of the PAL type (sequentiel logic), or by means of complex microprogrammed circuits (high speed sequencers . . . ) or by means of an assembly including a management microprocessor, a sequence memory (PROM, EEPROM or sustained CMOS memory modules) and some of the preceding circuits for generating high speed sequence parts. This latter configuration offers the most flexibility in operation, by allowing programming depending on the application: the number of optical measuring channels and the number of lines which they occupy; their position on the matrix; the integration factor along a line; the duration of the exposure time of the matrix sensor; the reading rate of the sensor; the output rate of the FIFOR memory. The sequencer 25 may receive an initiation signal SD from the outside.

In the converter circuit 21, the sample and hold circuit allows the analog signal to be held for the time required for conversion. After conversion, the digital information is stored in the FIFO register 22 then read at a slower rate by the signal ØF2. The FIFO memory allows the transmission rate to be reduced by a factor substantially equal to 2 with respect to the conversion frequency by using totally the time separating two conversion trains. The transmission which follows may be provided in series or in parallel by means of a wire, optical or short wave carrier.

The block diagram of FIG. 7 may be modified as shown in FIG. 8 where the video signal at the output of the amplifier may be applied directly to a storage circuit 26 which may be an analog recorder (magnetic, optical or with semiconductors). The storage member may also be stored in digital form in accordance with the second version shown in which the signal is first of all converted in the analog-digital converter circuit 21 and transmitted through an interface 27 to a digital recorder 28 (magnetic, optical or semiconductor).

The advantages and performances of the technique used are considered in an example of application to the high speed reading of a sensor TH 7882 at a clock speed of 10 MHZ (300 pixels per line) with a number N of samples per channel equal to 150 (one sample for two pixels out of 300 useful ones). To read all the information of the sensor under conventional conditions, a time equal to 28 milliseconds will be required. With the technique proposed, the time required for reading the useful information is reduced to 1.25 milliseconds, that is 23 times less.

It has been shown that a useful sample represents 3 n pixels (in the case envisaged n=2). This summation takes place at the level of the sensor, whereas the usual method consists in summing after conversion of the information into digital form, which has the drawback of summating the errors due to coding and those related to the noise factor of the output stage of the sensor. The technique used, by providing analog integration, is much superior in so far as the accuracy of the measurement is concerned.

The only information coded and transmitted is the useful information, whereby we have compression of the information. We have already seen that the ratio between the number of useful pieces of information and the number of pixels of the sensor were, for the example considered, equal to 1/58.

The coding speed may be reduced by half and the gain in information flow may be divided by four for the example considered with respect to conventional reading.

The elimination of the useless zones does not aversely affect the resolution of the useful information. It would not be the same if the image were concentrated in a more restricted area of the sensor sensor.

The summations or integrations carried out in the sensor allow a higher output signal to be obtained for an input illumination considered constant. For the example considered, the sensitivity may be considered multiplied by a factor 6, the summations being made for 6 pixels (2 pixels on 3 lines).

The smallest sample corresponds to a pixel of the matrix and gives the maximum line resolution L of P points but the image reading rate is slower. Generally, if the sample chosen includes r longitudinal pixels (Y) and n transverse pixels (X) namely r.n pixels, the resolution decreases, it becomes (L/n)×(P/r), on the other hand the image rate increases, it is multiplied by r.

What is claimed is:

1. A system for the high speed reading of an optical matrix sensor with charge transfer organized with single stroke frame transfer for the video detection of brief images, in which the video information is distributed over the detection matrix in several parallel bands each having several lines of pixels, the remaining part of the detection matrix forming gaps of separation between these bands and being deprived of useful video information, each gap also having several lines of pixels, the geometric XY arrangement of the bands on the detection matrix being known beforehand, the sensor including said detection matrix and a reading register connected to a video output circuit, the reading of the matrix being controlled by an associated signal generator and providing, not only for each band but also for each gap, the parallel transfer of the lines forming the band or the gap considered before commanding the series reading of the contents integrated in said register, so as to allow reading at maximum speed of said gaps while controlling the elimination of the corresponding detected noise, as well as for directly obtaining in analog form the integration pixel by pixel of the useful video signals of the lines of each band.

2. The system as claimed in claim 1, wherein the reading of the charge transfer sensor includes the following steps:
   a first period of successive parallel transfer of the lines without useful information forming the first gap into the reading register and summation point by point of the noise signals present,
   a second period for series reading of the register and elimination of said detected noise signals,
   a third period for the successive parallel transfer of the useful lines forming the first band into the reading register and summation point by point of the useful video signals present,
   a fourth period of series reading of the register and for obtaining in analog form said summated video signals relative to the first band,
   and so on for the other gaps and the other bands forming the rest of the image to be analyzed.

3. System as claimed in claim 1, wherein the video output is applied after amplification to an analog-digital converter with sample and hold unit for holding said analog video signals during the time required for conversion.

4. The system as claimed in claim 3, wherein the converter feeds in parallel a memory with FIFO register which is followed by an emitter circuit which puts the digital information into series for transmission and the control signal generator is a programmed sequencer which elaborates the control signals of the sensor and of the associated circuits.

5. The system as claimed in claim 3, wherein the converter feeds in parallel, through the interface circuit, a digital recorder device and the control signal generator is a programmable sequencer which elaborates the control signals of the sensor and of the associated circuits.

6. The system as claimed in claim 5, wherein the programmable sequencer allows the number of measuring channels, the number of lines of the sensor which each channel occupies, their position on the sensor, the integration factor along a line, the duration of the exposure time of the sensor, the reading rate of this sensor as well as the output rate of the FIFO slowing down memory to be selected, said programmable sequencer being mainly formed of a management unit based on a microprocessor and sequencer memory associated with logic circuits which may be microprogrammable or not.

7. The system as claimed in claim 1, wherein the video output is applied directly after amplification to an analgo recorder device and a control signal generator is a programmable sequencer which elaborates the signals for controlling the sensor and the recording device.

8. The system as claimed in claim 1, used in a multichannel system for recording optical signals by means of a streak camera.

* * * * *